United States Patent
Ramani et al.

(10) Patent No.: US 9,947,071 B2
(45) Date of Patent: Apr. 17, 2018

(54) TEXTURE PIPELINE WITH ONLINE VARIABLE RATE DICTIONARY COMPRESSION

(71) Applicant: Samsung Electronics Co., Ltd., Suwon-si, Gyeonggi-do (KR)

(72) Inventors: Karthik Ramani, San Jose, CA (US); Abhinav Golas, Mountain View, CA (US); John W. Brothers, Calistoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/742,291

(22) Filed: Jun. 17, 2015

(65) Prior Publication Data

US 2015/0379684 A1    Dec. 31, 2015

Related U.S. Application Data

(60) Provisional application No. 62/018,178, filed on Jun. 27, 2014.

(51) Int. Cl.
| | |
|---|---|
| *G06K 9/52* | (2006.01) |
| *G06T 9/00* | (2006.01) |
| *G06T 1/60* | (2006.01) |
| *G06T 11/40* | (2006.01) |

(52) U.S. Cl.
CPC ............... *G06T 1/60* (2013.01); *G06K 9/527* (2013.01); *G06T 11/40* (2013.01); *G06F 2212/40* (2013.01)

(58) Field of Classification Search
CPC ........ G06K 9/527; G06F 2212/40; G06T 9/00
See application file for complete search history.

(56) References Cited

U.S. PATENT DOCUMENTS

| | | |
|---|---|---|
| 5,539,468 A | 7/1996 | Suzuki et al. |
| 6,137,914 A | 10/2000 | Ligtenberg et al. |
| 6,243,416 B1 | 6/2001 | Matsushiro et al. |
| 6,668,086 B1 | 12/2003 | Enokida |
| 6,819,793 B1 * | 11/2004 | Reshetov ............... G06T 9/005 382/166 |
| 7,202,912 B2 | 4/2007 | Aneja et al. |
| 7,236,636 B2 | 6/2007 | Sakai et al. |
| 7,321,693 B2 | 1/2008 | Kadowaki |
| 7,576,888 B2 | 8/2009 | Sakai et al. |
| 7,750,938 B2 | 7/2010 | Grimes et al. |

(Continued)

*Primary Examiner* — Matthew Salvucci
(74) *Attorney, Agent, or Firm* — Lewis Roca Rothgerber Christie LLP

(57) ABSTRACT

A graphics system supports variable rate compression and decompression of texture data and color data. An individual block of data is analyzed to determine a compression data type from a plurality of different compression data types having different compression lengths. The compression data types may include a compression data type for a block having a constant (flat) pixel value over n×n pixels, compression data type in which a subset of 3 or 4 values represents a plane or gradient, and wavelet or other compression type to represent higher frequency content. Additionally, metadata indexing provides information to map between an uncompressed address to a compressed address. To reduce the storage requirement, the metadata indexing permits two or more duplicate data blocks to reference the same piece of compressed data.

19 Claims, 8 Drawing Sheets

| Flat-color value A | | Plane |
|---|---|---|
| Not compressible without loss | | Wavelet |
| | Plane | Flat-color value A |
| Wavelet | Flat-color value B | Other High Frequency |

Set of Data Blocks Having Different Compression
Data Types (Uncompressed Data)

(56) References Cited

U.S. PATENT DOCUMENTS

| | | | |
|---|---|---|---|
| 8,452,083 B2 | 5/2013 | Kambegawa | |
| 8,478,057 B1* | 7/2013 | Cui | G06T 9/004 |
| | | | 382/232 |
| 8,509,532 B2 | 8/2013 | Ushiku | |
| 8,533,166 B1* | 9/2013 | Sulieman | H04L 69/04 |
| | | | 375/240 |
| 8,553,301 B2 | 10/2013 | Tamura | |
| 8,659,793 B2 | 2/2014 | Takeishi | |
| 8,660,347 B2 | 2/2014 | Tamura | |
| 2008/0317362 A1 | 12/2008 | Hosaki et al. | |
| 2009/0148059 A1 | 6/2009 | Matsuda | |
| 2011/0069076 A1 | 3/2011 | Lindholm et al. | |
| 2011/0188750 A1 | 8/2011 | Tamura | |
| 2012/0320067 A1* | 12/2012 | Iourcha | G06T 9/00 |
| | | | 345/501 |
| 2013/0170558 A1* | 7/2013 | Zhang | H04N 19/176 |
| | | | 375/240.24 |

\* cited by examiner

Set of Blocks Of Texture Data
(Uncompressed Data, e.g., pixel color / texture data)

| | Flat-color value A | | Plane |
|---|---|---|---|
| Not compressible without loss | | | Wavelet |
| | Plane | Flat-color value A | |
| Wavelet | Flat-color value B | | Other High Frequency |

Set of Data Blocks Having Different Compression
Data Types (Uncompressed Data)

FIG. 3

TEXTURE PIPELINE WITH ONLINE VARIABLE RATE DICTIONARY COMPRESSION

CROSS REFERENCE TO RELATED APPLICATIONS

The present application claims the benefit of Provisional Application No. 62/018,178 filed Jun. 27, 2014 the contents of which are hereby incorporated by reference.

FIELD OF THE INVENTION

The present invention is generally directed towards the compression of color and depth data and decompression of texture data in a graphics processing unit (GPU). More particularly, the present invention is directed towards variable rate compression and decompression of color and texture data in a GPU.

BACKGROUND OF THE INVENTION

Texture mapping in a graphics processing unit (GPU) is responsible for adding detail to a computer generated graphics model. The process involves fetching actual color values and filtering them to produce the color for every pixel in the model. Texturing is a critical design component for 3D rendering performance and incurs a significant fraction of total processor power. In typical GPUs, the color values are fetched from memory before further filtering. Memory access due to texturing contributes to memory bandwidth and memory power and is a major source of performance bottlenecks. Reducing or eliminating memory accesses due to texturing is an important GPU design constraint.

Texture bandwidth contributes a major fraction of total memory bandwidth. It is a common industry practice to perform offline fixed rate compression of texture data to reduce memory bandwidth requirements. Compression is typically performed on blocks of data, where a block is a region of M×N pixels or texels. Square regions (M×M) are typically chosen for blocks because of cache locality and access pattern considerations.

The most popular compression algorithms belong to the category of fixed rate and fixed address lossy compression. In a graphics system, fixed rate compression schemes compress fixed size blocks of data, such as 4×4 blocks of pixels, into a fixed length of L bits, regardless of the frequency content of the blocks. Consequently, fixed rate compression schemes are inherently lossy because blocks with high frequency content cannot be compressed without loss into the fixed size. However, an advantage of fixed rate compression is that it permits a simple addressing scheme using fixed addresses. The fixed addresses, in turn, permits a straight forward addressing scheme during decompression, making it easy to perform decompression using efficient hardware based addressing schemes.

Examples of common compression standards used in the graphics field with fixed rate and fixed addressing include the DXT, ETC, and ASTC compression standards. In these compression standards, a texture image is broken into multiple M×N or M×M blocks, where M and N are positive integers. As one example, 4×4 blocks are very popular and employed in all DXT and ETC standards. Each of the 4×4 blocks of data are compressed to a fixed length, such as 8B or 16B. For example, for a fixed length of 8B, a 64×64 texture is broken down into 256 4×4 blocks and each of the 4×4 blocks are compressed down to a fixed size of 8 Bytes. ASTC allows for a choice of various blocks sizes from 4×4 to 12×12 as a global per texture choice. However, once a block size is chosen, it remains the same across the whole texture.

However, the evolution in fixed rate compression algorithms is entering an era of diminishing returns and suffers from various problems. One problem is that there are situations in which the fixed rate algorithms are inefficient. For example, if there are duplicate blocks, each block is separately compressed. If there are identical blocks with high frequency information at two ends of a texture, each of the identical blocks must be compressed into separate duplicate blocks. As a result, the standard fixed rate compression algorithms can be extremely inefficient for situations in which a texture has many duplicate blocks and in redundant high frequency content blocks.

Another problem is that there are applications in which conventional fixed rate lossy compression in unacceptable. Fixed rate compression is typically used for static textures, which are compressed offline. However, this does not address some of the issues faced in game applications when there are dynamic textures generated during run time. In particular, there are applications in which the GPU dynamically generates color data and lossy compression (color data precision loss) in unacceptable under current GPU API standards like Open GL® or GL ES®. Even if lossy compression is acceptable, conventional fixed rate compression is time intensive and thus cannot be applied to dynamically generated textures.

SUMMARY OF THE INVENTION

A graphics system supports variable rate compression and decompression of texture data and color data in a texture pipeline. An individual block of data is analyzed to determine a compression data type from a plurality of different compression data types having different compression lengths. A block of color values may correspond to pixel or texel color values. The compression technique applied to the data block is based on the compression data type of a block. Examples of compression data types include a data type in which all of the color values of a block have the same color data, a data type in which the color values of the block vary in a manner that can be described by a plane equation, and a data type in which the block can be represented as having higher frequency content by a wavelet technique, spline or other approach. Rules may be included to limit the compression length to a maximum compression length for a block and to not perform compression if the maximum length would be violated. Metadata indexing provides information to map between an uncompressed address and a compressed address to fetch the compressed data. To reduce the storage requirement, the metadata indexing permits two or more duplicate data blocks to reference the same piece of compressed data. Hardware assists may be provided to perform variable rate compression and decompression during runtime of dynamically generated textures.

One embodiment of a method of variable rate compression of texture and color data in a texture pipeline of graphics processing system includes analyzing a set of blocks of color values associated with a texture or image. For each block of color values, a determination is made of a compression data type of the block of color values from a plurality of compression data types each having a different compressed length. Each block of color values is compressed based on its compression data type. Metadata is generated defining a mapping between an uncompressed texture address space of each block to a compressed texture address space and which indicates the compression data type of each block.

BRIEF DESCRIPTION OF THE DRAWINGS

FIG. 2 illustrates a set of data block of uncompressed texture data and FIG. 3 illustrates classifying the data blocks based on a compression data type for variable rate compression in accordance with an embodiment of the present invention.

DETAILED DESCRIPTION

Generally speaking, embodiments of the present invention include variable rate compression of color and texture data in a graphics system, as well as decompression of the compressed data. This includes techniques to transform texture data to modified texture data and metadata header data, where the combined memory footprint of the modified texture and metadata header data is smaller than the actual uncompressed texture data. Additionally, embodiments of the present invention include techniques to access the modified texture data and decode it to the actual texture data.

Figure 1:
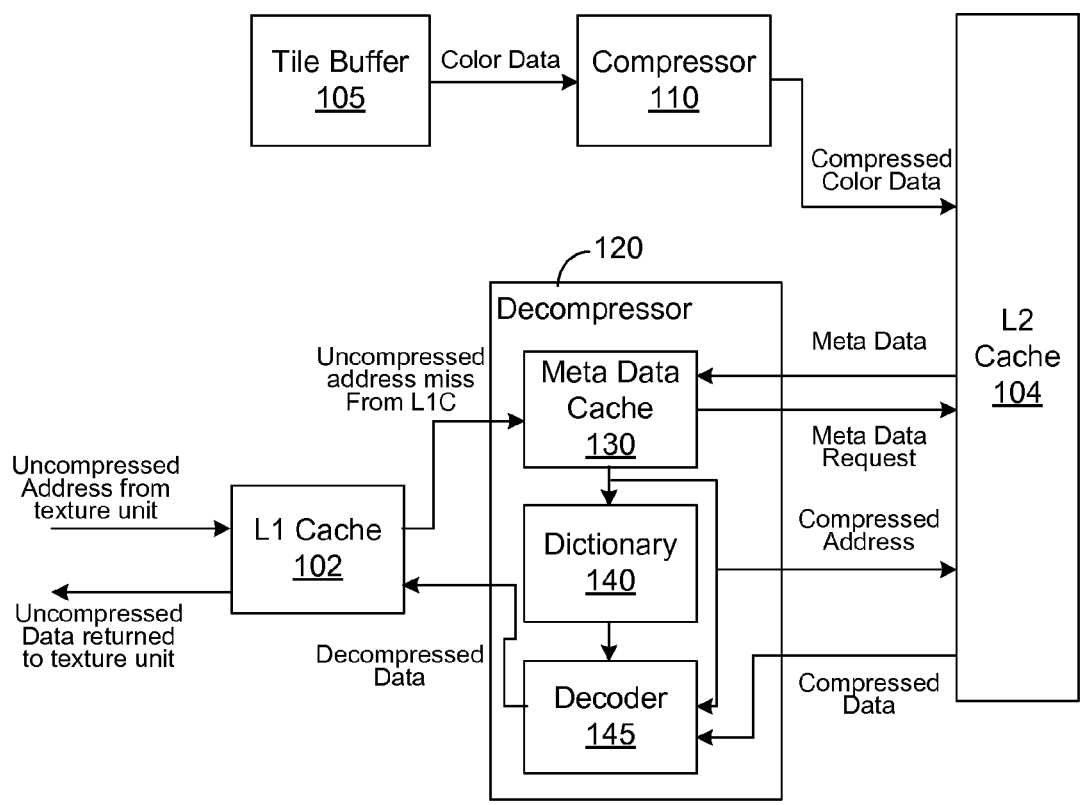
FIG. 1 is a block diagram illustrating variable rate compression and decompression in a texture pipeline of a graphics system in accordance with an embodiment of the present invention.

FIG. 1 is a block diagram illustrating aspects of variable rate compression and decompression in a texture pipeline of a Graphics Processing Unit (GPU) in accordance with an embodiment of the present invention. The GPU may be implemented as a system on a chip having processors, on-chip memory, and a texture pipeline as part of a larger graphics pipeline. In this example, the compression and decompression are performed in a GPU having an on-chip L1 cache 102 and L2 cache 104 to minimize a need to access off-chip memory, although more generally the variable rate compression and decompression may be used in other ways.

In one embodiment a variable rate compressor 110 supports different compression lengths for different types of data (e.g., a flat data compression type, linear data compression type, and a wavelet data compression type, as described below in more detail). In this example, the compressed color data generated by compressor 110 is stored in the L2 cache 104. Additionally, a metadata manager (not shown) in compressor 110 generates metadata to assist in address mapping during decompression. A decompressor 120 includes a meta data cache 130, dictionary table 140, and decoder 145. The metadata cache 130 is populated with metadata via metadata requests to the L2 cache 104, as illustrated by the arrows in FIG. 1. The metadata is cached so that the metadata may be re-used multiple times for each fetch. This increases the bandwidth benefits. Texture accesses have a high degree of spatial locality. As result, a cache line of metadata may be initially accessed followed by one or more data cache lines of compressed data from the L2 cache as needed.

The compressed data is accessed from the L2 cache and provided to decoder 145. Decoder 145 supports different types of decoding based on a compression type and thus may also be considered as having several different decoders. A pass-through path is provided for uncompressed blocks. Once the compressed data is received, it is sent to the appropriate decoder depending on the compression data type. For example, a 2-bit code supports three different compression types and an uncompressed data type. More generally, an arbitrary number of different compression types could be supported.

On a miss in the L1 cache 102, the address is sent to the decompressor 120. The address is looked up in the metadata cache 130 (e.g., via a header table or other data structure) to find the transformed memory address in L2 cache. For the purposes of illustration, the decompressor 120 is illustrated with a dictionary table 140 to support common cases of duplicate blocks.

Figure 2:
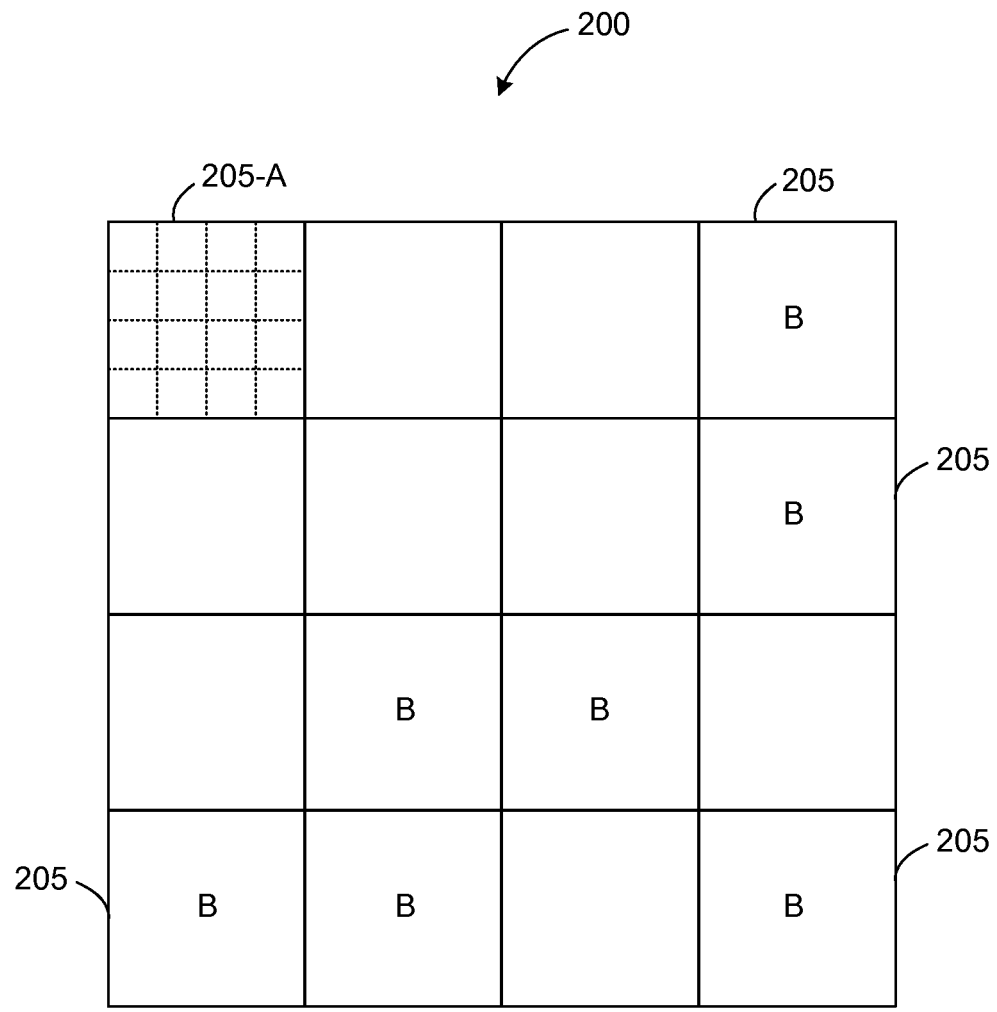

FIGS. 2 and 3 illustrate aspects of variable rate compression in accordance with embodiments of the present invention. FIG. 2 illustrates a K×K set 200 of uncompressed data blocks, B, of texture or pixel data of a graphics system. A texel or a pixel represents a color value. An individual data block 205 corresponds to an array of pixel color values having a pre-selected size of n×n, such as a 4×4 array (indicated by dashed lines in block 105-A). Contiguous groups of individual data blocks from 1 block to many blocks 205 also corresponds to a tile, such as a 4×4 tile of data values (e.g., color data), received from the tile buffer 105. For the purposes of illustrating aspects of the present invention, each element in the array of values in a block 105 will be described as a pixel or texel having color data but it will be understood that more generally other types of data could be represented by the texture data, such as depth data, normals or reflection maps, etc. In computer graphics, a texel (texture element) is the smallest graphical element in two-dimensional (2-D) texture mapping to create the impression of a textured surface. A texel is similar to a pixel (picture element) because it represents an elementary unit in a graphics pipeline. However, there may be more than one color value mapped to each texel. Additionally, more generally a texture can be considered to be an array of data and may include color data, luminance data, stencil data, or other types of data.

As illustrated in FIG. 3, one aspect of embodiments of the present invention is that individual data types of uncompressed data blocks are classified into different compression data types, each of which may have a different compression length. Illustrative examples of compression data types include a flat compression data type in which all of the pixel values within a block are constant, a plane or gradient compression data type in which the pixel values vary according to a plane equation within the data block, and a wavelet compression data type in which the data is compressible using a wavelet compression scheme. Additionally, there may be individual blocks having a high frequency content that are not compressible without loss. Additionally, there may be data blocks compressible according to other types of compression known in the art, such as splines.

Determining a compression data type for a data block permits optimizing the compression of an individual block. For example, for a flat block, in which all of the pixels have the same color value only a single representative value needs to be compressed to represent all of the color values of the block. Additionally, the compression of blocks containing higher frequency content can be performed using a longer compression length to implement lossless compression. Moreover, decisions may be made to not compress blocks that are not compressible without loss within a maximum compression length.

In a K×K set of blocks there may also be blocks at different locations that are duplicates of others. For example, suppose that there are two flat blocks that are duplicates of other in the sense that they have the same constant pixel color value "A". Because these two blocks are duplicates of each other, an additional improvement in compression can be achieved by storing one compressed value for all duplicate flat blocks. More generally, there may be instances in which blocks of the same compression data type are duplicates of each other, such as two or more of the plane blocks being duplicates of each other, or two or more of the wavelet compression data type blocks being duplicates of each other.

Figure 4:
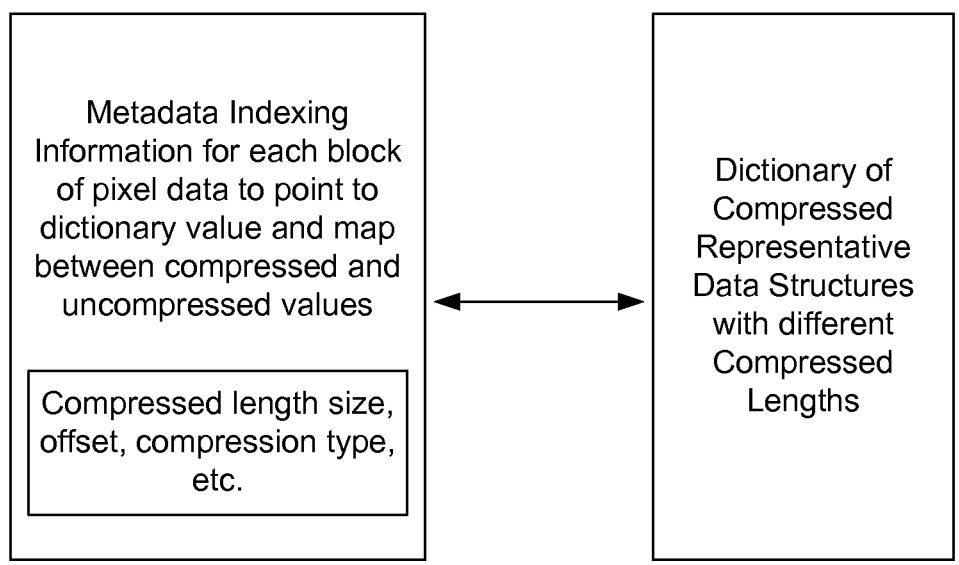
FIG. 4 illustrates the use of metadata and a dictionary to eliminate redundant storage of compressed data blocks in accordance with an embodiment of the present invention.

As illustrated in FIG. 4, one option is to store a single instance of compressed data for the duplicate blocks as a dictionary value and to generate metadata to support address mapping during decompression. The metadata defines a mapping from uncompressed texture address space to compressed texture address space, in addition to defining the kind of compression used. Examples of metadata to aid in pointing to a dictionary value and mapping between compressed and uncompressed values include a compressed data type, a compressed length, and an offset. The mapping defined by the metadata is not expected to be unique for duplicate blocks and thus multiple uncompressed addresses may map to the same compressed address. In this way a large reduction in the storage requirements of compressed data for duplicate blocks is achieved. Additionally, another option is to store a compressed texture in memory (e.g., the L2 cache or other memory) representing the compressed data and access it as required, as illustrated in FIG. 1.

An exemplary variable rate compression scheme is as follows. First the tile buffer 105 sends out pixel color data (for example, RGBA8888 format) to the compressor 110 for a tile of size n×n pixels. The compressor 110 processes an n×n pixel square block at a time from the whole tile. For the purpose of illustration, n=4 will be used unless explicitly stated.

For each n×n block, the compressor 110 makes a determination of the data compression data type and corresponding entries are made in a metadata cache. Examples include determining whether a block has flat (constant) pixel data compression type; determining whether a block represents a plane or gradient compression type; or determining whether the block can be represented as a wavelet based compression type. However, it will be understood that additional compression types may be supported and that there may also be instances in which a block is not compressible without loss. The compressed data may be stored as a modified texture in the L2 cache 104. The metadata may be used as an address translator that translates from the uncompressed address space to a compressed address space in order to fetch the modified texture and decompress them in the decoder.

Consider the case of a flat compression type. For the case of a flat compression data type, an n×n block needs one entry in the meta-data cache (also referred to as header table interchangeably) 130 and the mapping process can point to a dictionary value stored in a dictionary table of dictionary 140. In one embodiment additional bits referred to as "CompressionType" (00) are used to indicate that this was a flat compressed block. A determination is made whether flat compression is to be employed for an n×n block. Flat compression is used when all of the pixels in a block can be represented by the same value. If all of the pixels in the block have the same color value, then the block is marked as a flat block and stored as a single pixel value (e.g., RGBA8888) in the dictionary 140. This corresponds to a compression ratio of 16:1 for an individual 4×4 block. Additionally, if the block is duplicated, a further improvement in compression efficiency occurs due to the fact that a single dictionary value represents two or more duplicate blocks. Table 1 illustrates a comparison of uncompressed block sizes to compressed block size for flat blocks for common texel formats.

TABLE 1

| Constant Block Sizes for Common Texel Formats | | | | | | | |
|---|---|---|---|---|---|---|---|
| Format | RGBA8888 | RGBA16161616 | RGBA4444 | RGB565 | R8 | Z24 | Z32 |
| Uncompressed 4 × 4 Block Size (bytes) | 64 | 128 | 32 | 32 | 16 | 48 | 64 |
| Compressed Block Size (bytes) | 4 | 8 | 2 | 2 | 1 | 3 | 4 |

If the block is not a flat, then a determination is made whether the block is one of the other supported compression types. A determination is made if the n×n block represents a plane (or gradient) that can be represented by a linear function ax+by+c, where a, b, c are color constants, and x, y are pixel coordinates. Additionally, an optional fine detail component may be included. The detail component augments the color produced by the linear equation using a per-pixel additive value stored in 2's complement, leading to the color value=ax+by+c+d (x, y). In these cases, three color values can represent the whole n×n block (with an optional fourth color value if the fine detail component is included). Linear blocks thus provide an approximate compression ratio of 2-to-2.5× for 4×4 blocks. The compression type bits are referred to as CompressionType is (01) to indicate that this is a plane (or gradient).

For this situation there are several options to store the three pixel values of the n×n block. One option is to store the three pixel values in the dictionary 140 with an entry in the meta-data table. Another option is to store the values in memory as a modified texture along with the length of the three values (12 Bytes for RGBA8888 format). In this case, the metadata maps an uncompressed address to a compressed address in memory. Table 2 illustrates a comparison of uncompressed block size to compressed block size for linear block for common texel formats.

TABLE 2

Linear Block Sizes for Common Texel Formats

| Format | RGBA8888 | RGBA16161616 | RGBA4444 | RGB565 | R8 | Z24 | Z32 |
|---|---|---|---|---|---|---|---|
| Uncompressed 4 × 4 Block Size (bytes) | 64 | 128 | 32 | 32 | 16 | 48 | 64 |
| Compressed Block Size w/o detail (bytes) | 13 | 25 | 7 | 6.75 | 3.25 | 9.25 | 12.25 |
| Compressed Block Size w. detail (bytes) | 29 | 41 | — | — | 7.25 | 21.25 | 28.25 |

If the block is not a flat block type or a plane type, then a determination is made whether it is another type, such as a spline or wavelet compression types. For example, a general Wavelet or DGR block is a block stored using a generic two coefficient wavelet based Golomb-Rice (DGR) code. DGR provides an average compression ratio of 1.6× for a 4×4 blocks. General Wavelet blocks are ones in which no polynomial fit of data can be achieved with degree <4. In such cases, an efficient method of storing such blocks is to use a wavelet basis, which is then stored using recursive indexing followed by an run-length code, which may be implemented using a Golomb-Rice coding scheme.

As examples of compression sizes for DGR blocks, consider the case of 4×4 blocks and the common texel formats of R8, Z24, and RGBA8888. In this example, this would lead to blocks of maximum size 16, 48, and 64 bytes respectively.

Additionally, in one embodiment a fallback to storing uncompressed data is included if the block cannot be compressed using the other compression schemes in a manner that is acceptable. For example consider the case that lossless compression is a requirement for a dynamic texture. If lossless compression is required, then if none of the compression schemes support lossless compression for the block a fallback is to store uncompressed data for the block. For the case of DGR, the wavelet compressor may include a rule that is the wavelet compressor cannot construct a representation smaller than the maximum compression length, the block is to be stored as-is without any compression.

The decoder 145 supports pass through of uncompressed data. However, for compressed data the decoder performs a decoding operation based on the compression type. An exemplary decompression scheme is as follows. For the first time a new texture cache-line address is requested by the Level 1 cache 102, the meta-data cache 130 sends an address request to fetch the meta-data and the dictionary for the texture. The uncompressed address is stored in a FIFO in the meta-data cache 130. The address request may include a separate texture identifier (T# ID). For 4×4 tiles, a request for a quad in a specific texture may be identified by the tuple of T#, and the address in the texture. This information permits a metadata query to be performed that includes a tile offset (from the texture base address) and a 4×4 block offset within the tile.

The Level 2 cache 104 returns the meta-data along with the dictionary to decode the texture. This is stored in the meta-data cache 130 and the dictionary table 340. The uncompressed address is fetched from the FIFO and is used to look up the meta-data cache to decipher one of the following based on the "CompressionType" bits.

For a flat compressed block, the CompressionType is 00, which indicates that the cache line address is represented by one value. In one embodiment, the meta-data cache contains an index into the dictionary table that fetches the pixel value and sends it to the decoder for expansion to n×n color values. The data is returned to the L1 cache. For such cases, all Level 2 cache and thus memory accesses are eliminated. In another embodiment, the flat value may be stored along with the compressed data. In such a case, the meta-data cache contains an compressed address from which the flat value is fetched.

For a Planar/Gradient compression block the CompressionType is 01 and indicates the cacheline address is represented by a plane. Assuming the 3 vertices of a plane are stored in memory, the meta-data cache contains a compressed address in the L2 cache from which to fetch 12 Bytes. The L2 cache returns 12B to the decoder which further computes all n×n values and sends them back to the L1 cache.

Additional "CompressionType" Values are indicated by using different values for each compression algorithm that is used. For example a CompressionType of 10 may be used to indicate wavelet/DGR compression and a Compression type of 11 may be used indicated uncompressed data. Data is either fetched from the L2 cache 304 or from the dictionary table and is sent to the L1 cache 302. For the case of wavelet compression, the decoder computes all n×n values of the uncompressed data and sends them back to the L1 cache.

As an illustrative example, consider a given texture (8×8) that contains RGBA8888 (4 Byte texel) data. The total size of the texture is 256 Bytes uncompressed. In one embodiment, the texture is broken down into four 4×4 blocks of data. The metadata can be represented as header table that contains 4 entries, one for each block. The header table is indexed by the block number. The header table stores two values, a block offset (8 bits for example for byte addressability) and a block length (1 bit, one to indicate 4 byte or 64 byte blocks). The block offset is added to the base address of the texture to fetch data from memory. If all 16 values of blocks one and two are the same, then only 4 Bytes of storage are needed for the whole block. The compressed length of the block is 4 Bytes compared to 64 Bytes for the uncompressed block. In this case, the first entry of the header table has an offset 0 to indicate starting block address, and a length indicator bit of 0 (4 bytes). The second entry has an offset 4 to indicate it is 4 bytes from the starting texture address. Assume that texels in block 3 and block four are all not the same and are stored as 64B quantities. Entry 3 in the header table has an offset of 8 and a length indicator bit of 1 to indicate that the length is 64B. Entry 4 is similarly filled.

When the texture L1 cache sends out a texture address, the decompressor 120 identifies the block number from the texel address and looks into the header table of the meta data cache 130. For any texel in the first block, it looks up the offset to compute the actual memory address. It then looks up the length indicator bit (in this case, 0) to figure out that only 4B of data need to be read. It sends the memory address along with the length to L2 cache and/or memory to fetch only 4 B. Once data is returned by L2 cache, the decoder 345 uses the length bit to replicate the color value for all 16 texels in the block.

In this simple example, the decompressor 120 fetches a total of 141 bytes from memory as opposed to 256 bytes in the traditional case, providing a memory BW reduction of up to 45%.

It will be understood that one option is to selectively use variable rate compression for applications in which it provides the greatest benefits. For example, the variable rate compression may be selectively turned on when dynamic textures are generated by the GPU during runtime and turned off when static textures are used.

The metadata in the meta data cache 130 may be organized into a hierarchical table or other hierarchical data structure. As an illustrative example, support may be provided for different block sizes, such a block sizes from 4×4 to 64×64. A bit code may be used to indicate the block size of a texture. For example, a bit code of 001 may be used to indicate a 4×4 level hierarchy and a 101 bit code may be used to indicated a 64×64 level hierarchy.

As an example of a hierarchical metadata structure, the data structure may store a starting index into a decoder table and a code book table for each hierarchy. A cache may be provided or a decoder table to perform both metadata decoding and uncompressed to compressed translation. A separate cache may be provided for a code book table for code word storing. The decoder table may include bits to represent each hierarchy include bits to represent a partition offset into memory, an actual offset in memory and length, a code book value for each quad. In one embodiment a code book table may contain four texel values for each quad.

The choice of block size determines the total size of the meta-data and also the compression ratio of the block. There are tradeoffs between block size and metadata overhead. For example, choosing a 4×4 block supports compressing many blocks with either a flat compression or a linear compression. For example, a 64×64 texture requires 256 meta-data entries. If each meta-data entry is 33 bits (the total size of meta data is 1056 B or 17 L1 cache lines, thus leading to a meta-data overhead of 6.6% or 2.06 bits/texel in a block. Increasing the block size to 8×8 texels reduces the meta-data overhead by 4× to 264B or 5 L1$ cache lines, thus leading to an overhead of 1.9% or 0.51 bits/texel in a block. However, there is a greater computation effort to perform linear compression for an 8×8 block. Consequently, a 8×8 block may not allow for linear compression due to the increased arithmetic and area complexity and potentially reduces the compression rate. It will be understood that as an optimization choices can be provided for a driver to choose between different block sizes.

Figure 5:
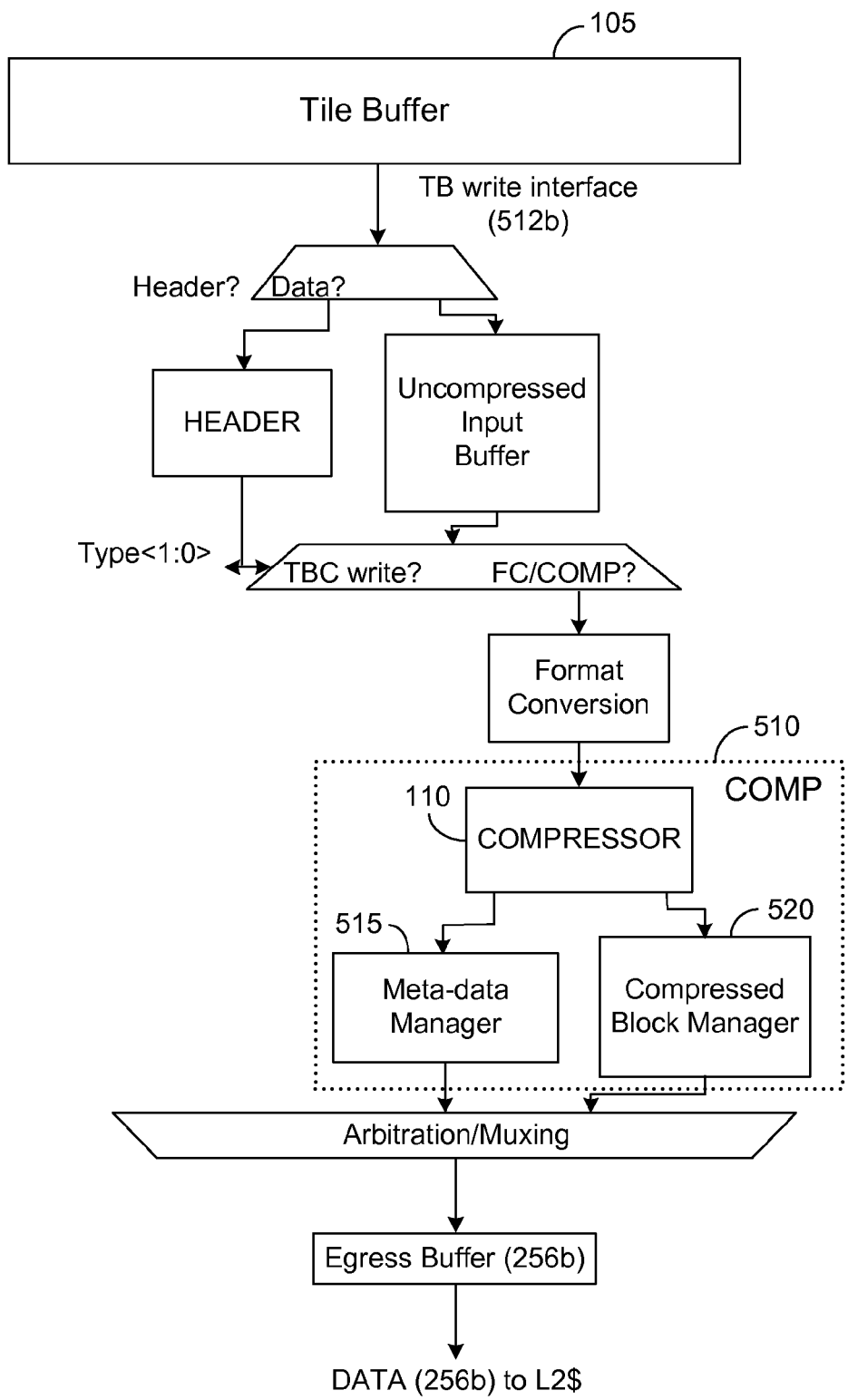
FIG. 5 illustrates a variable rate compression block in accordance with an embodiment of the present invention.

FIG. 5 illustrates an embodiment of the compressor as part of a COMP block 510 including a variable rate compressor 110, meta-data manager 515 and compressed block manager 520 with additional optional features to support the flow of color/depth compression and format conversion. For brevity, the tile buffer read interface is not shown in the diagram. When a tile is rendered, the Tile Buffer 105 (TB) writes to the decompression/compression units. The header information may be used as an input to determine whether to write to a tile buffer cache (TBC). A decision is also made whether to perform format conversion (FC) and/or compression (COMP). In addition, the TB sends auxiliary information to convey data type, render target (RT) type, format, base address (VA), compression mode, and relative tile and block address within the render target. The compression mode specifies if the RT is required to be compressed. Format specifies the type, number, and width of each component in a color value. An example is RGBA8888_UNORM data. A 64B block consists of a 4×4 block of RGBA8888 data. The data type could be depth or color data and primitive table data (which is bypassed).

For RTs that require compression, the COMP unit 510 accumulates these values, performs the compression operation using variable length compressors (VLCs) and sends compressed data every cycle to the L2 cache at the block address specified by the TB. An exemplary output data size to the L2 cache is 256 B. As previously discussed, in one embodiment four different classes of compression algorithms are supported by COMP unit. For efficient addressing, a metadata map is generated to translate every uncompressed pixel location into a compressed location along with the type and width of compressed data. This meta-data is stored in a meta-data address pointed to by the driver. The meta-data manager 515 may be assigned to manage the meta-data storage process. The COMP unit 510 is responsible for accumulating meta-data and compressed data into cache-lines before sending them out to a L2 cache slice.

In cases where the RT is the final RT, it is sent directly to the L2 cache as the final frame buffer. In such cases, Format Conversion (FC) unit may be involved in intermediate operations. The FC unit performs format conversion and expansion to the final RT format.

Figure 6:
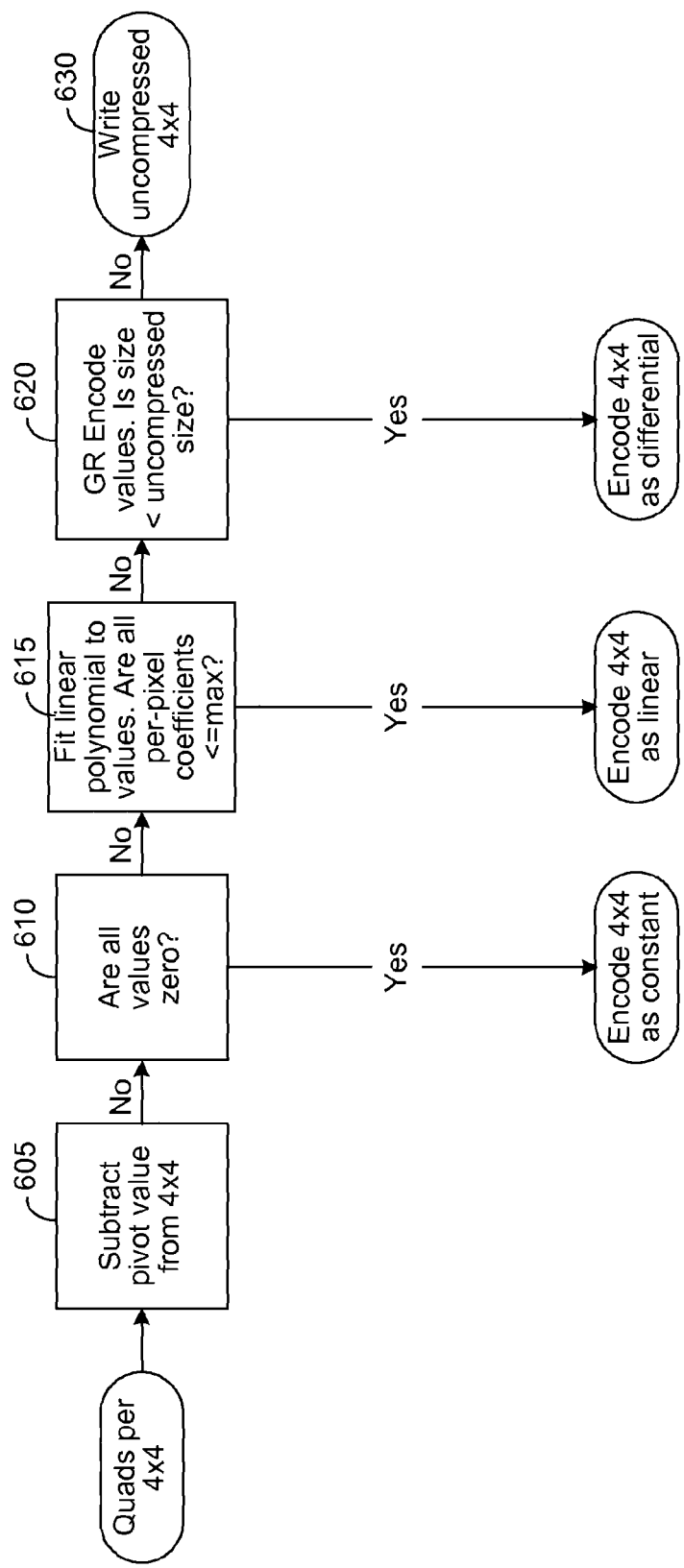
FIG. 6 illustrates a variable rate compression process in accordance with an embodiment of the present invention.

FIG. 6 illustrates an example of decision sub-modules of a compressor to perform a variable rate compression process in accordance with an embodiment of the present invention. The block compressor can decide on up to 4 possible results, choosing to detect some or all the following block types:

Constant
Linear
Differential GR or Wavelet.
Uncompressed

The compression process begins for each received uncompressed 4×4 quad by converting all color values into deltas by subtracting a pivot value from every pixel 605, using a 15-wide subtraction block. This pivot value is fixed to be the color value at the (0, 0) pixel within a 4×4, referred to as c(0, 0). Note that certain data types which are unsigned may need to be extended with one extra sign bit for this step. The results of this step D(x, y) are used by subsequent decision blocks. A decision is made in block 610 if all of the resulting values are zero. If yes, the 4×4 block is encoded as a constant. If not, a decision is made whether or not a linear polynomial may be fitted to the value of the block 615. If so, the block is encoded as a linear block. If not, a decision is made whether or not GR wavelet compression may be used to encode the block 620. This may include checks whether or not the total size of the encode value is less than an uncompressed size. An additional check may be performed to determine whether or not the compressed size is less than a maximum allowable compressed size. If the block fails the GR encoding it is written as an uncompressed block 630.

FIG. 6 illustrates a linear sequence of operations. However, more generally some of the operations may be performed in parallel and the compression scheme having the minimum compression length is then selected. For example, blocks 615 and 620 may be performed in parallel if desired and the compression scheme achieving the minimum compression length is then selected.

Hardware support is preferably provided for variable rate compression and decompression. The hardware support may include implementing at least some of the compression and decompression processing using mathematical operations implemented in hardware. That is, it is preferable from a speed and power consumption standpoint to implement as much of the compression and decompression process in hardware as possible. One aspect of the variable rate compression process is that it may be implemented using hardware assists to improve computational speed and power efficiency. For example, the flat compression type may be implemented using comparatively simple hardware to perform subtraction and accumulation operations. The linear data compression type and DGR compression type may also be performed using hardware assists. Conversely, the decoding/decompression operations may be implemented using hardware assists. The ability to use hardware assists for the compression and decompression operations improves speed and power consumption, thus facilitating the use of variable rate compression and decompression during runtime for dynamic textures.

Figure 7:
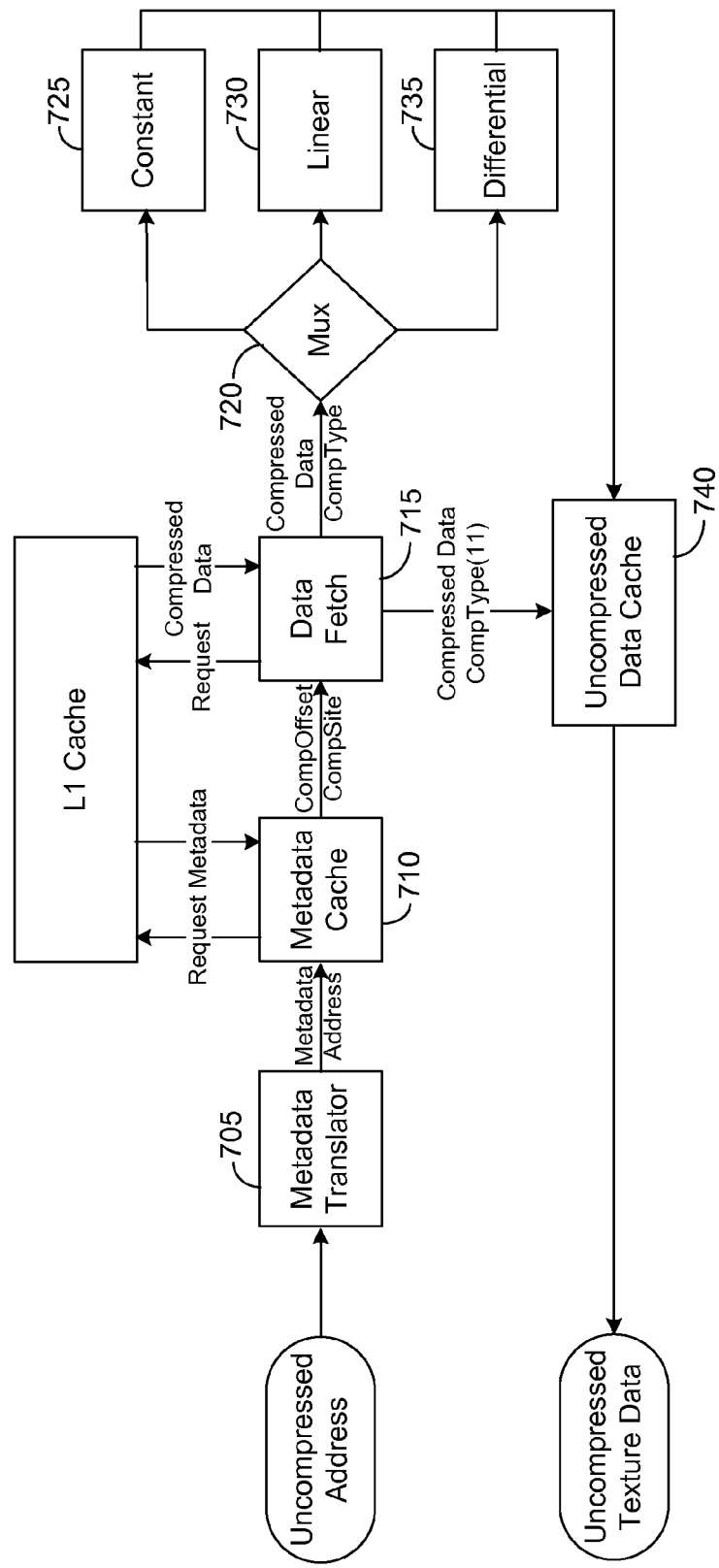
FIG. 7 illustrates a variable rate decompression process in accordance with an embodiment of the present invention.

FIG. 7 illustrates aspects of a variable rate decompression process for 4×4 quads in accordance with an embodiment of the present invention. On receiving a request for a quad in a specific texture, as identified by the tuple of T#, and uncompressed address in the texture, a metadata translator 705 first performs a metadata query to a metadata cache 710. This query functions by computing a tile offset (from the texture base address) and 4×4 block offset within the tile. If a texture descriptor (fetched using the T#), notes that the texture has constant tiles, the tile offset is used to query within the per-tile bit-vector. Depending on the result of this step, 1 or k cache lines may need to be fetched into the metadata buffer from an on-chip cache memory. If the bit-vector value is 1 for the tile, and the metadata line has been fetched, the metadata translator 705 instructs the bypass of any data fetch. Otherwise, after querying the metadata for compressed address and block Size, read requests are sent for the relevant cache line(s) in a data fetch 715.

Once the compressed data is received, a mux 720 may be used to send the compressed data is sent to the appropriate decoder depending on the CompressionType. In this example, the compressed data for a flat data type is sent to a corresponding flat data decoder 725, compressed data for a linear (planar) data type is sent to a linear decoder 730, and a differential (DGR wavelet) data type is stent to a differential decoder 735. A pass-through path exists for uncompressed blocks.

An intermediate cache is included within the data fetch block 715 to cache fetched compressed data, with the address of the cache line acting as a tag, to reduce redundant compressed data fetch.

Decoded quads are written to an intermediate storage buffer 740 where the 4×4 block is constructed, before being returned to a texture unit.

The individual decoder blocks 725, 730, and 735 may be implemented using hardware assists that are effectively inverse operations to the compression process. Thus the decompression process may also be implemented to be relatively quick and power efficient.

Figure 8A:
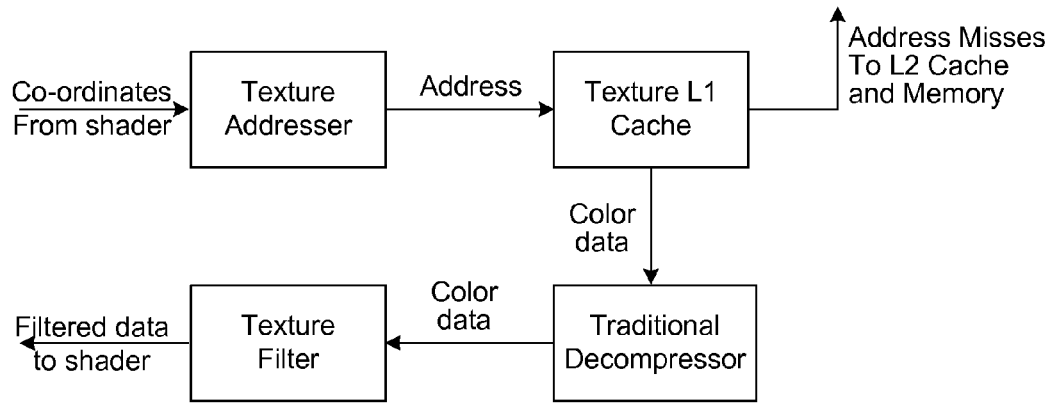
FIG. 8A illustrates a conventional process to handle L1 cache misses of texture data.
Figure 8B:
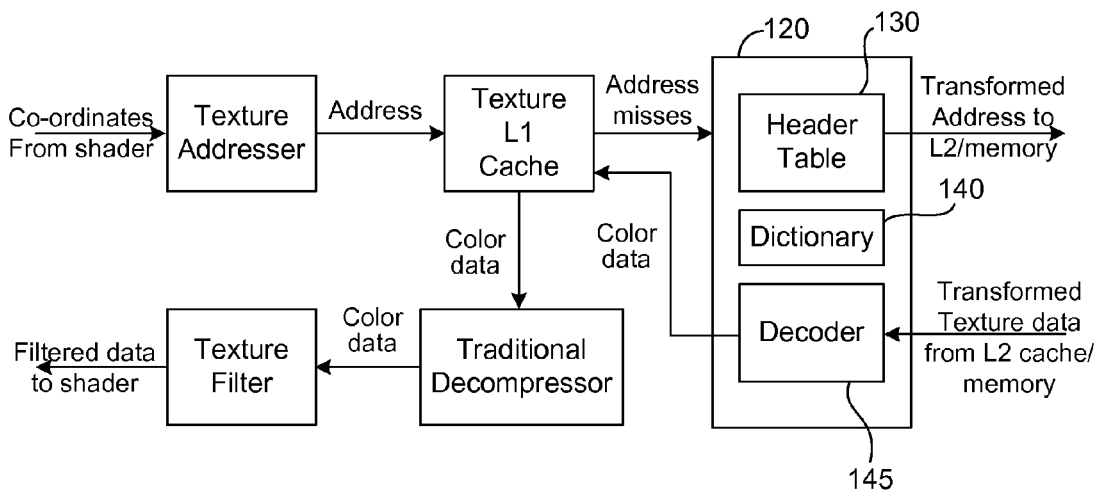
FIG. 8B illustrates a process to handle L1 cache misses using variable rate decompression of transformed texture data in L2 cache memory in accordance with an embodiment of the present invention.

FIGS. 8A and 8B illustrate additional aspects of embodiments of the present invention. Referring to FIG. 8A, a conventional texture pipeline is illustrated which includes a conventional scheme to decompress color data for a L1 cache. Whenever there are L1 cache misses, the misses are addressed to L2 cache and memory. The steps are as follows:

1. The processor sends input co-ordinates to a texture addresser.
2. A texture addresser converts co-ordinates into memory addresses for fetching data and sends them to the L1 texture cache.
3. The L1 texture cache fetches the data and sends it to a conventional decompressor. On a miss in the L1 cache, data is fetched from L2 cache or from memory.
4. A lossy decompressor then decompresses the color data and sends it to texture filter.
5. A filter unit interpolates the input data and sends it back to processor engine.

FIG. 8B illustrates a process including a variable rate decompressor block 120. The steps are as follows:

1. On a miss in L1 cache, the address is sent to the variable rate decompressor block claimed 120. The address is looked up in the header table of the metadata cache 130 to find the transformed memory address in L2 cache.
2. The L2 cache then sends the transformed texture data back to the variable rate decompressor block 120. The block decodes the transformed data to the actual texture data that is sent back to the L1 cache.

One aspect of the present invention illustrated in FIGS. 8A and 8B is that the variable rate compression and decompression approach may be used in combination with conventional decompression schemes. That is, embodiments of the present invention may be used in a manner complementary to conventional compression and decompression approaches by, for example, aiding in efficiently storing texture data in a compressed form in L2 cache memory. The efficient storage of compressed texture data on chip in a L2 cache memory also reduced a need to access off-chip memory when there is a L1 cache miss.

As previously discussed, an application of variable rate compression and decompression is for use with dynamic textures generated at runtime. Hardware assists for the variable rate compression and decompression provide performance advantages for speed and energy efficiency. The time constraints are very tight with dynamic textures. Consequently, the use of hardware assists to aid in performing variable rate compression and decompression provides important benefits for speed and energy efficiency.

As previously discussed, an application of the present invention is for use with dynamic textures in which lossless compression is required. However, it will be understood that the variable rate compression and decompression may also be applied to applications in which lossy compression is acceptable.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of variable rate compression of pixel or texel color values in a texture pipeline of graphics processing system, comprising:
analyzing a set of blocks of color values of one of a texture and an image, wherein the one of the texture and the image is divided into the set of blocks of color values, each of the blocks of color values comprising a region of n×n pixels or texels (n being a natural number);
for each individual block of color values, independently determining an associated data type of a plurality of data types based on the individual block of color values, each of the plurality of data types having a different compressed length with each data type having an associated compression type, the plurality of data types comprising a flat data type, a planar data type, and one of a wavelet data type and a spline data type;
for each block of color values, compressing color data of each block based on the determined associated data type, the determined associated data type being one of the flat data type, the planar data type, the wavelet data type, or a spline data type;
for each compressed block of color values, generating metadata defining a mapping between an uncompressed texture address space of each block to a compressed texture address space and which indicates the data type of each block; and
decompressing a block of pixels by accessing a dictionary value and using the dictionary value to generate uncompressed color data for a plurality of data blocks.

2. The method of claim 1, wherein duplicative blocks in the set of blocks are indexed to a single instance of representative compressed data.

3. The method of claim 2, further comprising generating a dictionary, wherein the metadata defines an index to representative compressed data in the dictionary.

4. The method of claim 1, wherein the flat data type is one in which all of the color values of the block have the same value and a single representative color value is compressed to represent the data of the block.

5. The method of claim 4, wherein the planar data type is one in which three color values are used to represent the color values of the block.

6. The method of claim 5, wherein one of a wavelet compression and a spline compression is used to compress the color values of the block associated with a corresponding one of the wavelet data type and the spline data type.

7. The method of claim 1, wherein the compression is performed at runtime for a dynamic texture.

8. The method of claim 1, further comprising of variable rate decompression of a block of pixels, including utilizing the metadata to identify compressed data for the block and the compression type and performing decompression using a decoder selected for the compression type to obtain uncompressed color data for the block.

9. The method of claim 8, wherein a decompressor receives an uncompressed address miss from a cache and in response accesses metadata and dictionary or compressed values and performs decoding to generate decompressed data for the cache.

10. The method of claim 9, wherein the variable rate compression and decompression are performed at least in part in hardware.

11. The method of claim 1, wherein the variable rate compression is lossless compression and a data block that cannot be compressed within a maximum size limit is stored as an uncompressed block.

12. The method of claim 1, wherein the variable rate compression includes compressing texture data into compressed data and storing the compressed data as a transformed texture in an on-chip L2 cache memory.

13. The method of claim 12, further comprising in response to a cache memory miss, using the metadata to determine the address of the compressed texture data, retrieving the compressed texture data, decoding the compressed texture data, and providing uncompressed texture data to the cache memory.

14. A graphics processing unit, comprising:
a texture pipeline including:
a compressor to perform variable rate compression of blocks of data of a texture by:
analyzing the blocks of data of the texture, the texture being divided into the blocks of data, each of the blocks of data comprising a region of n×n pixels or texels (n being a natural number);
for each individual block of data, independently determining an associated data type of a plurality of data types based on the individual block of data, each of the plurality of data types having a different compressed length with each data type having an associated compression type, the plurality of data types comprising a flat data type, a planar data type, and one of a wavelet data type and a spline data type;
for each block of data, compressing data of each block based on the determined associated data type, the determined associated data type being one of the flat data type, the planar data type, the wavelet data type, or a spline data type; and
a decompressor to perform decompression of the compressed data by accessing a dictionary value and using the dictionary value to generate uncompressed color data for a plurality of data blocks.

15. The graphics processing unit of claim 14, wherein for a set of duplicate blocks having generating identical compressed values the compressor stores a single representative compressed value and each instance in the set of duplicate blocks is indexed to the same representative compressed value.

16. The graphics processing unit of claim 14, wherein the flat data type is one in which all color values of a block have the same value and the compressor stores a single representative color value to represent the block.

17. The graphics processing unit of claim 16, wherein the planar data type is one in which three color values are used to represent color data of the block.

18. The graphics processing unit of claim 14, wherein the graphics processing unit performs compression at runtime for dynamic textures.

19. The graphics processing unit of claim 14, further comprising on-chip L1 and L2 cache memory, wherein the graphics processing unit performs variable rate compression of texture data stored in the L2 cache and the decompressor decompresses the compressed data stored in the L2 cache.

* * * * *